US008751737B2

(12) United States Patent
Bu et al.

(10) Patent No.: US 8,751,737 B2
(45) Date of Patent: Jun. 10, 2014

(54) METHOD AND APPARATUS FOR USING A SHARED RING BUFFER TO PROVIDE THREAD SYNCHRONIZATION IN A MULTI-CORE PROCESSOR SYSTEM

(75) Inventors: Tian Bu, Basking Ridge, NJ (US); Girish Chandranmenon, Edison, NJ (US); Pak-Ching Lee, Kwai Chung (HK)

(73) Assignee: Alcatel Lucent, Paris (FR)

( * ) Notice: Subject to any disclaimer, the term of this patent is extended or adjusted under 35 U.S.C. 154(b) by 788 days.

(21) Appl. No.: 12/492,598

(22) Filed: Jun. 26, 2009

(65) Prior Publication Data
US 2010/0332755 A1    Dec. 30, 2010

(51) Int. Cl.
*G06F 5/10*    (2006.01)
(52) U.S. Cl.
USPC ............ 711/110; 711/147; 711/156; 709/213
(58) Field of Classification Search
USPC .......................... 711/110, 147, 156; 709/213
See application file for complete search history.

(56) References Cited

U.S. PATENT DOCUMENTS

| | | | | |
|---|---|---|---|---|
| 6,134,607 | A * | 10/2000 | Frink | 710/22 |
| 7,111,092 | B1 * | 9/2006 | Mitten et al. | 710/52 |
| 7,487,271 | B2 * | 2/2009 | Khawand et al. | 710/52 |
| 7,743,182 | B2 * | 6/2010 | Duisenberg | 710/52 |
| 2006/0236011 | A1 * | 10/2006 | Narad et al. | 710/240 |
| 2007/0121499 | A1 * | 5/2007 | Pal et al. | 370/230 |
| 2011/0131352 | A1 * | 6/2011 | Allen et al. | 710/55 |

OTHER PUBLICATIONS

Lee et al. A Lock-Free, Cache-Efficient Shared Ring Buffer for Multi-Core Architectures. ANCS'09, Oct. 19-20, 2009. http://www.cse.cuhk.edu.hk/~pclee/www/pubs/ancs09poster.pdf.*
L. Foschini et al., "A Parallel Architecture for Stateful, High-Speed Intrusion Detection," Proc. of ICISS, Dec. 2008, pp. 203-220.
C. Kruegel et al., "Stateful Intrusion Detection for High-Speed Networks," IEEE Symp. on Security and Privacy, May 2002.
L. Lamport, "Concurrent Reading and Writing," Communications of the ACM, Nov. 1977, vol. 20, No. 11, pp. 806-811.
L. Lamport, "Proving the Correctness of Multiprocess Programs," IEEE Trans. on Software Engineering, vol. SE-3, No. 2, Mar. 1977, pp. 125-143.

(Continued)

*Primary Examiner* — Arpan P. Savla
*Assistant Examiner* — Samuel Dillon
(74) *Attorney, Agent, or Firm* — Wall & Tong, LLP

(57) ABSTRACT

An apparatus and method for improving synchronization between threads in a multi-core processor system are provided. An apparatus includes a memory, a first processor core, and a second processor core. The memory includes a shared ring buffer for storing data units, and stores a plurality of shared variables associated with accessing the shared ring buffer. The first processor core runs a first thread and has a first cache associated therewith. The first cache stores a first set of local variables associated with the first processor core. The first thread controls insertion of data items into the shared ring buffer using at least one of the shared variables and the first set of local variables. The second processor core runs a second thread and has a second cache associated therewith. The second cache stores a second set of local variables associated with the second processor core. The second thread controls extraction of data items from the shared ring buffer using at least one of the shared variables and the second set of local variables.

18 Claims, 6 Drawing Sheets

(56) References Cited

OTHER PUBLICATIONS

V. Paxson et al., An Architecture for Exploiting Multi-Core Processors to Parallelize Network Intrusion Prevention, Proc. IEEE Sarnoff Symposium, May 2007.
ftp://ftp.prenhall.com/pub/esm/computer_science.s-041/stallings/Slides/OS4e_PPT_Slidesv2/ printed Apr. 5, 2010.
Intel 64 and IA-32 Architectures Optimization Reference Manual, Intel Corporation, Nov. 2009.
William Stallings, "Operating Systems, Internals and Design Principles (Sixth Edition)," 2009 Pearson Education, Inc., Chapter 5, pp. 205-261.

* cited by examiner

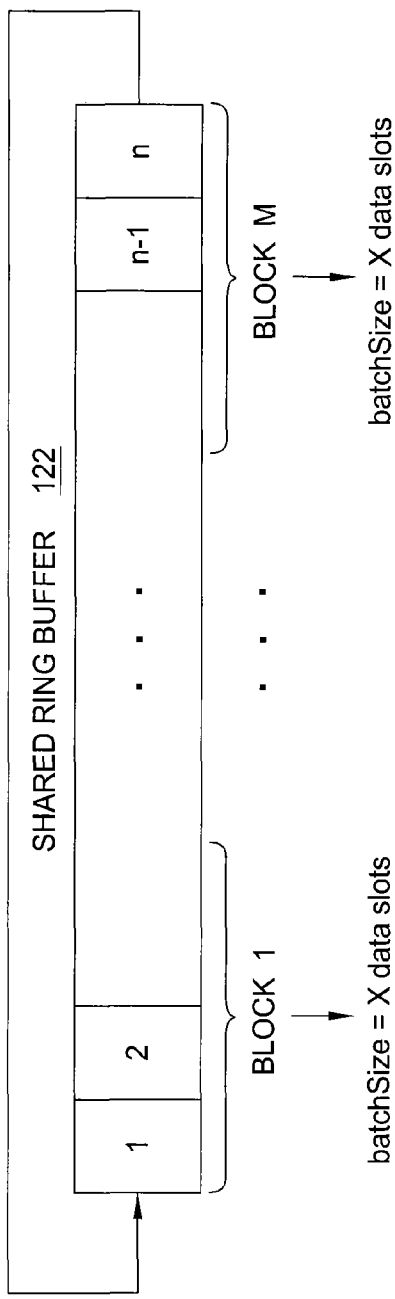
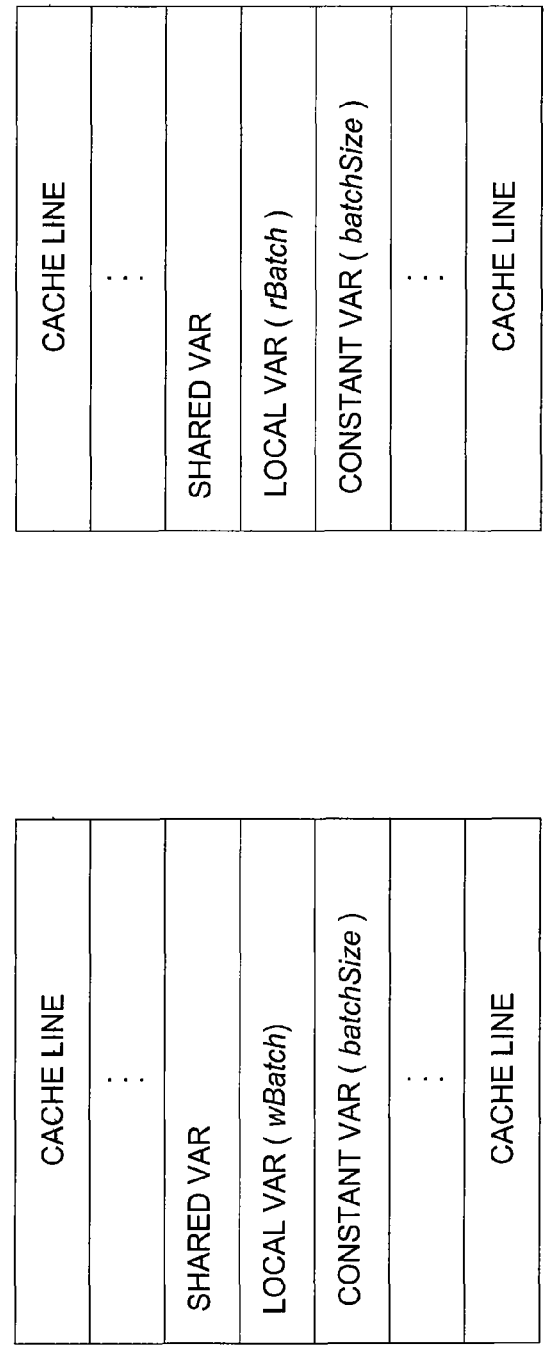
FIG. 3

```
/* Variable definitions */
1: char cachePad0[CACHE_LINE];
2: /*shared control variables*/
3: int read;
4: int write;
5: char cachePad1[CACHE_LINE - sizeof(int)];
6: /* consumer's local control variables*/
7: int localWrite;
8: int nextRead;
9: int rBatch;
10: char cachePad2[CACHE_LINE - 3 * sizeof(int)];
11: /*producer's local control variables*/
12: int localRead;
13: int nextWrite;
14: int wBatch;
15: char cachePad3[CACHE_LINE - 3 * sizeof(int)];
16: /*constants*/
17: int max;
18: int blockOnEmpty;
19: int batchSize;
20: char cachePad4[CACHE_LINE - 3 * sizeof(int)];
21: T* data;
```
— 410

```
function Insert(T data)
  1: int afterNextWrite = NEXT(nextWrite);
  2: if afterNextWrite == localRead then
  3:   while afterNextWrite == read do
  4:     barrier( );
  5:   end while
  6:   localRead == read;
  7: end if
  8: buffer[nextWrite] = data;
  9: nextWrite = afterNextWrite;
 10: wBatch++;
 11: if wBatch ≥ batchSize then
 12:   write = nextWrite;
 13:   wBatch = 0;
 14: end if
```
420

```
function Extract(T* data)
  1: if nextRead == localWrite then
  2:   while nextRead == write do
  3:     if blockOnEmpty == 0 then
  4:       return -1; /*no data item is read*/
  5:     end if
  6:     barrier( );
  7:   end while
  8:   localWrite = write;
  9: end if
 10: *data = buffer[nextRead];
 11: nextRead = NEXT(nextRead);
 12: rBatch++;
 13: if rBatch ≥ batchSize then
 14:   read = nextRead;
 15:   rBatch = 0;
 16: end if
 17: return 0; /*a data item is read*/
```
430

METHOD AND APPARATUS FOR USING A SHARED RING BUFFER TO PROVIDE THREAD SYNCHRONIZATION IN A MULTI-CORE PROCESSOR SYSTEM

FIELD OF THE INVENTION

The invention relates to the field of information processing and, more specifically but not exclusively, to multi-core information processing systems.

BACKGROUND

Multi-core processor architectures utilize two or more independent central processing units (CPUs) to provide improved information processing capabilities over conventional single-processor architectures. A multi-core processor architecture enables information processing tasks to be divided into subtasks which may be parallelized across multiple threads running on the multiple processor cores of the multi-core processor architecture. Multi-core processor architectures are employed in a variety of information processing applications. For example, a multi-core processor architecture may be utilized to monitor the behavior of data traffic in a communication network, a capability which is important for many network management applications, such as resource provisioning, security, and the like. For many such applications that rely on traffic monitoring, real-time traffic monitoring invariably are performed. Real-time traffic monitoring requires processing of packets in real time, meaning that the speed of packet processing needs to keep up with the line rate of the communication link for which traffic is being monitored. This presents a considerable problem, because as the volume of traffic in communication networks continues to increase, the bandwidth on communication links of communication networks also increases and, thus, packet processing speed needs to increase. Disadvantageously, however, while multi-core processor architectures provide significant improvements in real-time packet processing and other information processing applications, the use of multi-core processor architectures for real-time packet processing and other information processing applications remains a challenging issue due to implementation issues often associated with implementing multi-core processor architectures.

SUMMARY

Various deficiencies in the prior art are addressed through apparatuses and methods for improving synchronization between threads in a multi-core processor system.

In one embodiment, an apparatus includes a memory, a first processor core, and a second processor core. The memory includes a shared ring buffer for storing data units, and stores a plurality of shared variables associated with accessing the shared ring buffer. The first processor core runs a first thread and has a first cache associated therewith. The first cache stores a first set of local variables associated with the first processor core. The first thread of the first processor core controls insertion of data items into the shared ring buffer using at least one of the shared variables and the first set of local variables. The second processor core runs a second thread and has a second cache associated therewith. The second cache stores a second set of local variables associated with the second processor core. The second thread of the second processor core controls extraction of data items from the shared ring buffer using at least one of the shared variables and the second set of local variables.

In one embodiment, an apparatus includes a first processor core running a first thread and having a first cache associated therewith, a second processor core running a second thread and having a second cache associated therewith, and a memory including a shared ring buffer for storing data units. The first processor core accesses the shared ring buffer for inserting data units into the shared ring buffer. The second processor core accesses the shared ring buffer for extracting data units from the shared ring buffer. Access to the shared ring buffer by the first processor core and the second processor core is controlled using a plurality of variables, the variables comprising a plurality of shared variables, a first set of local variables stored in the first cache, and a second set of local variables stored in the second cache.

In one embodiment, a method is provided for operating a multi-core processor system. The multi-core processor system includes a first processor core, a second processor core, and a memory. The memory includes a shared ring buffer that is shared by the first processor core and the second processor core, and, further, stores a plurality of shared variables. The method includes inserting, by the first processor core, data items into the shared ring buffer, where the first processor core performs insertion of the data items using at least one of the shared variables and a first set of local variables stored within a first cache associated with the first processor core. The method includes extracting, by the second processor core, data items from the shared ring buffer, where the second processor core performs extraction of the data items using at least one of the shared variables and a second set of local variables stored within a second cache associated with the second processor core.

BRIEF DESCRIPTION OF THE DRAWINGS

The teachings presented herein can be readily understood by considering the following detailed description in conjunction with the accompanying drawings, in which:

FIG. 3 depicts an embodiment for providing batch updating of control variables in the multi-core processing system of FIG. 1;

FIG. 4 depicts an exemplary embodiment for controlling access by the producer thread and the consumer thread to a shared ring buffer of the multi-core processing system of FIG. 1;

To facilitate understanding, identical reference numerals have been used, where possible, to designate identical elements that are common to the figures.

DETAILED DESCRIPTION

A multi-core thread synchronization capability provides thread synchronization in a multi-core processor architecture in accordance with an embodiment of the invention, thereby reducing the cost of inter-core communication so that threads running on different cores can efficiently exchange state information required for improving information processing capabilities. In one embodiment, the multi-core thread synchronization capability is provided using a shared ring buffer and control variables associated with the shared ring buffer which are adapted for use in controlling access to the shared ring buffer (the combination of which may be referred to herein as a Multi-Core Ring Buffer, or MCRingBuffer for short). The MCRingBuffer allows threads running in different cores to exchange control information in a manner for minimizing the cost of inter-core communication. In one embodiment, the MCRingBuffer reduces the memory access overhead of thread synchronization by enforcing cache locality of the control variables associated with the shared ring buffer.

Figure 1:
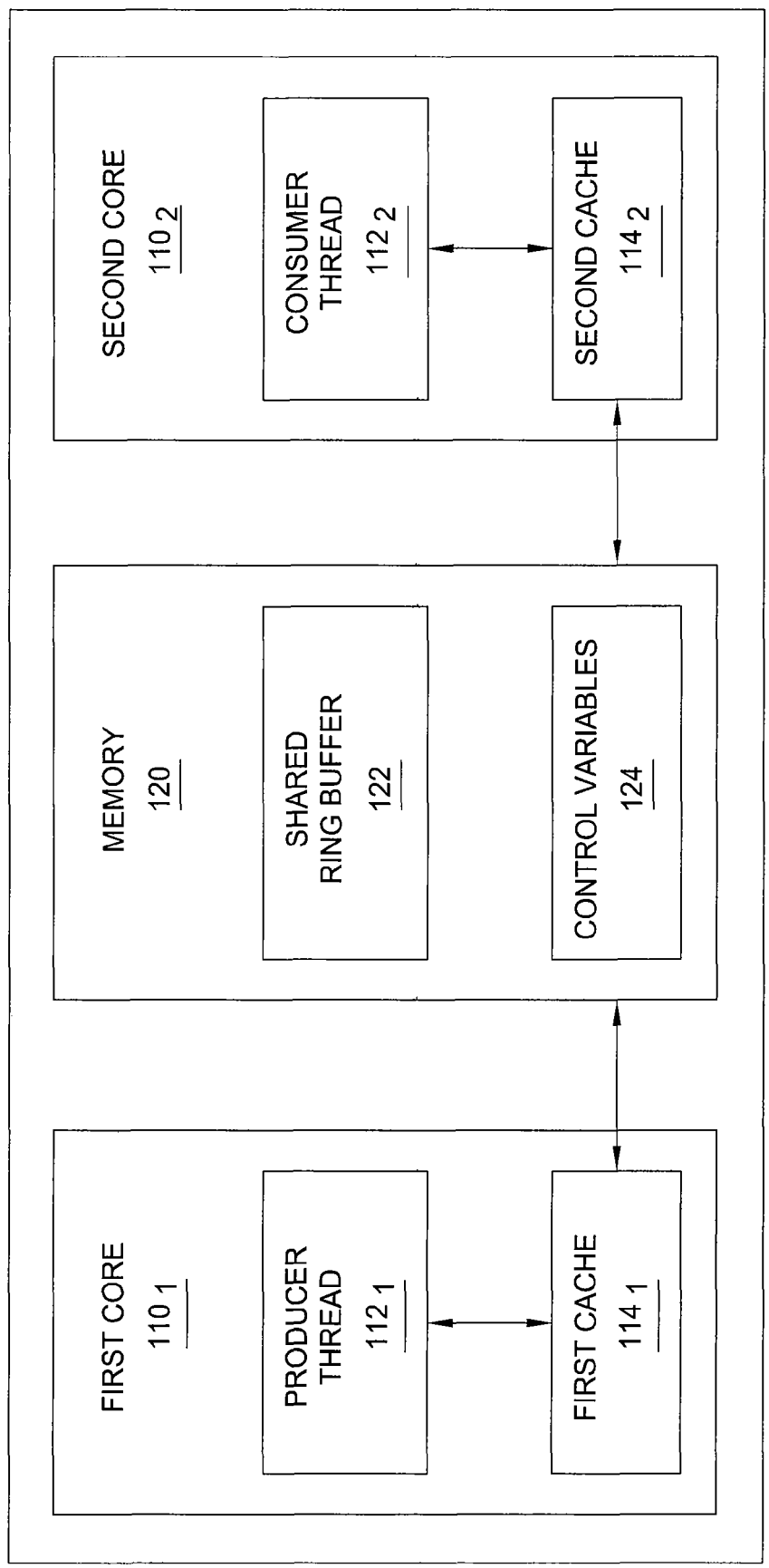
FIG. 1 depicts a high-level block diagram of a multi-core processing system.

FIG. 1 depicts a high-level block diagram of a multi-core processing system.

As depicted in FIG. 1, multi-core processing system 100 includes a first core $110_1$ and a second core $110_2$ (collectively, cores 110) which share a memory 120.

The first core $110_1$ is running a first thread $112_1$ (which also may be referred to herein as a producer thread, as described hereinbelow) and includes a first cache $114_1$. The first thread $112_1$ running on first core $110_1$ is capable of performing tasks for processing information stored in memory 120. The first thread $112_1$ running on first core $110_1$ is capable of accessing memory 120 for both storing information and retrieving information. The first thread $112_1$ running on first core $110_1$ is capable of caching information from memory 120 in first cache $114_1$. The first cache $114_1$ caches, for first core $110_1$, information stored in memory 120 such that first core $110_1$ may access the cached information locally without accessing memory 120.

The second core $110_2$ is running a second thread $112_2$ (which also may be referred to herein as a consumer thread, as described hereinbelow) and includes a second cache $114_2$. The second thread $112_2$ running on second core $110_2$ is capable of performing tasks for processing information stored in memory 120. The second thread $112_2$ running on second core $110_2$ is capable of accessing memory 120 for both storing information and retrieving information. The second thread $112_2$ running on second core $110_2$ is capable of caching information from memory 120 in second cache $114_2$. The second cache $114_2$ caches, for second core $110_2$, information stored in memory 120 such that second core $110_2$ may access the cached information locally without accessing memory 120.

The memory 120 is shared by first core $110_1$ and second core $110_2$. The first core $110_1$ and second core $110_2$ both access memory 120 for purposes of inserting information into memory 120 and extracting information from memory 120. The first thread $112_1$ and second thread $112_2$ access the memory via first cache $114_1$ and second cache $114_2$, respectively, such that the information accessed from memory 120 may be cached within first cache $114_1$ and second cache $114_2$.

The memory 120 includes a shared ring buffer 122. The shared ring buffer 122 is a bounded buffer having a fixed number of slots for storing data items. The shared ring buffer 122 stores data items inserted into memory 120 by first core $110_1$ and extracted from memory 120 by second core $110_2$. It will be appreciated that a data item stored in shared ring buffer 122 may be any type of information which may be stored in memory, which may depend, for example, on the application for which multi-core processing system 100 is used. For example, in an embodiment in which multi-core processing system 100 is used for communication network traffic monitoring, each data item may be a packet, or portion of a packet, to be processed for providing communication network traffic monitoring. For example, in an embodiment in which multi-core processing system 100 is used for computer gaming, each data item may be an action message or update message to be processed for the computer game. It will be appreciated that the shared ring buffer 122 may store any type of data item in any suitable format.

The memory 120 also includes control variables 124 adapted for use in controlling access to shared ring buffer 122. The control variables 124 include control variables adapted for use by producer thread $112_1$ on first core $110_1$ and consumer thread $112_2$ on second core $110_2$ for accessing shared ring buffer 122. The control variables 124 are cached in first cache $114_1$ and second cache $114_2$ for providing cache locality of control variables 124 which enables thread synchronization between producer thread $112_1$ and consumer thread $112_2$ and, further, which enables a reduction in the number of memory accesses to memory 120 for inserting data items into and extracting data items from shared ring buffer 122.

In one embodiment, control variables 124 associated with shared ring buffer 122 are classified into four groups: (i) a set of shared variables which are accessed by both the producer thread $112_1$ and the consumer thread $112_2$ (e.g., write and read), (ii) a set of local variables for the producer thread $112_1$ (e.g., nextWrite, localRead, and the like), (iii) a set of local variables for the consumer thread $112_2$ (e.g., nextRead, localWrite, and the like), and (iv) a set of constant variables.

The shared variables are stored in memory 120 and cached in first cache $114_1$ and second cache $114_2$ when accessed from memory 120 by the producer thread $112_1$ and the consumer thread $112_2$, respectively. The producer thread $112_1$ and consumer thread $112_2$ use the cached versions of the shared control variables whenever possible in order to reduce the number of memory accesses to memory 120 for inserting data items into and extracting data items from shared ring buffer 122.

The set of local variables for the producer thread $112_1$ are stored in memory 120 when the shared ring buffer 122 is first initialized, and are then cached in first cache $114_1$ when accessed from memory 120 by the producer thread $112_1$ when producer thread $112_1$ begins operating to insert data items into shared ring buffer 122 (e.g., when the Insert( ) function, which is described hereinbelow, is called). As the producer thread $112_1$ operates to insert data items into shared ring buffer 122, producer thread $112_1$ accesses the local control variables from first cache $114_1$ whenever possible to provide the cache locality which enables improved thread synchronization in the multi-core processing system 100.

The set of local variables for the consumer thread $112_2$ are stored in memory 120 when the shared ring buffer 122 is first initialized, and are then cached in second cache $114_2$ when accessed from memory 120 by the consumer thread $112_2$ when consumer thread $112_2$ begins operating to extract data items from shared ring buffer 122 (e.g., when the Extract( ) function, which is described hereinbelow, is called). As the consumer thread $112_2$ operates to insert data items into shared ring buffer 122, consumer thread $112_2$ accesses the local control variables from second cache $114_2$ whenever possible to provide the cache locality which enables improved thread synchronization in the multi-core processing system 100.

The set of constant variables are stored in memory 120 when the shared ring buffer 122 is first initialized, and are then cached in first cache $114_1$ and second cache $114_2$ when accessed from memory 120 by the producer thread $112_1$ and the consumer thread $112_2$, respectively. The set of constant variables may include one or more control variables adapted for use in combination with the shared variables and the local variables to provide the different functions depicted and described herein.

Although omitted for purposes of clarity, it will be appreciated that memory 120 may store various other information, e.g., programs, data, and the like, as well as various combinations thereof.

The MCRingBuffer provides the multi-core thread synchronization capability, enabling thread synchronization between first thread $112_1$ on first core $110_1$ and second thread $112_2$ on second core $110_2$ for accessing shared ring buffer 122.

The use of the MCRingBuffer to provide the multi-core thread synchronization capability that is depicted and described herein may be better understood by first considering a standard shared ring buffer.

A standard shared ring buffer (often referred to as a producer-consumer ring buffer) is a bounded buffer with a fixed number of slots. A standard shared ring buffer operates such that a producer thread inserts data items to the shared ring buffer when the shared ring buffer is not full, and a consumer thread extracts data items from the shared ring buffer when the shared ring buffer is not empty. The buffer accesses of the producer thread and the consumer thread are synchronized so that the data items are extracted by the consumer thread in the same order in which the data items are inserted by the producer thread.

A standard shared ring buffer may be implemented as a lock-free ring buffer that allows both the producer thread and the consumer thread to access the shared ring buffer, but not simultaneously. A lock-free ring buffer may be implemented using a monitor construct, which defines a critical section for the entire ring buffer and allows only one process (either producer or consumer) to access the buffer at any given time. In such an implementation, a process needs to first acquire a lock before accessing the buffer. This lock-based approach is generally inefficient since it does not allow the producer thread and the consumer thread to simultaneously access the ring buffer even through both threads may access different buffer slots.

A standard shared ring buffer may be implemented as a concurrent lock-free ring buffer that allows both the producer thread and the consumer thread to simultaneously access the buffer without using a monitor construct. A concurrent lock-free ring buffer uses two control variables, write and read, to refer to buffer slots that the producer thread and consumer thread will insert to and extract from, respectively. In such an implementation, letting max be the size of the ring buffer and letting NEXT( ) be the function that advances write or read to the next buffer slot (including wrapping around the buffer if needed), the ring buffer is said to be full if NEXT (write)==read and is said to be empty if read==write. This enables the producer thread and the consumer thread to concurrently access different buffer slots of the buffer as long as the buffer is neither full nor empty. This implementation is referred to herein as a BasicRingBuffer.

The MCRingBuffer in accordance with an embodiment of the invention increases the speed of shared data accesses enabled by standard shared ring buffers, including the BasicRingBuffer, by reducing the cost of thread synchronization between the cores of the multi-core architecture, namely, between first core $110_1$ and second core $110_2$. The MCRingBuffer supports concurrent lock-free access to shared ring buffer 122 by first core $110_1$ and second core $110_2$ by using first cache $114_1$ and second cache $114_2$. As described herein, the MCRingBuffer provides these features by supporting cache locality of at least a portion of the control variables 124 associated with shared ring buffer 122.

In one embodiment, control variables 124 that are utilized to provide cache locality while controlling access to shared ring buffer 122 include: (i) a set of shared variables which are utilized by the producer thread $112_1$ and the consumer thread $112_2$ (e.g., write and read utilized by producer thread $112_1$ and consumer thread $112_2$, respectively), (ii) a set of local variables for the producer thread $112_1$ (denoted as nextWrite and localRead), (iii) a set of local variables for the consumer thread $112_2$ (e.g., nextRead and localWrite), and, optionally, (iv) a set of constant variables. In this embodiment, the local control variables nextWrite and nextRead represent the local control variables of the producer thread $112_1$ and the consumer thread $112_2$ that point to the next buffer slot of the shared ring buffer 112 to be inserted to and extracted from, respectively. In this embodiment, the local control variables localRead and localWrite represent the local variables that producer thread $112_1$ and consumer thread $112_2$ estimate or "guess" for the current values of the shared variables, read and write, respectively.

A general description, according to one embodiment, of the manner in which producer thread $112_1$ and consumer thread $112_2$ may utilize the above-described shared control variables and local control variables in order to control insertions/extractions of data items into/from shared ring buffer 122, respectively, follows. The producer thread $112_1$ (consumer thread $112_2$) compares the nextWrite (nextRead) variable with the localRead (localWrite) variable to decide whether the shared ring buffer 122 is potentially full (empty). If the shared ring buffer 122 is not potentially full (empty), the producer thread $112_1$ (consumer thread $112_2$) inserts (extracts) the data item into (from) the shared ring buffer 122. If the shared ring buffer 122 is potentially full (empty), the producer thread $112_1$ (consumer thread $112_2$) compares the nextWrite (nextRead) variable with the read (write) variable stored in memory 120 to decide whether the shared ring buffer 122 is actually full (empty). If the shared ring buffer 122 is not actually full (empty), the producer thread $112_1$ (consumer thread $112_2$) inserts (extracts) the data item into (from) the shared ring buffer 122. If the shared ring buffer 122 is actually full (empty), the producer thread $112_1$ (consumer thread $112_2$) updates the localRead (localWrite) variable with the latest value of the read (write) variable, which may have been modified multiple times by the consumer thread $112_2$ (producer thread $112_1$). This process allows both the producer thread $112_1$ and the consumer thread $112_2$ to work in first cache $114_1$ and second cache $114_2$, respectively, whenever possible.

It will be appreciated that the process described above is merely one embodiment by which cache locality may be implemented for improving thread synchronization between producer thread $112_1$ and consumer thread $112_2$. Exemplary methods by which cache locality may be implemented for improving thread synchronization between producer thread $112_1$ and consumer thread $112_2$ are depicted and described with respect to FIG. 5 and FIG. 6, respectively.

In one embodiment, one or both of the following features may be utilized to support enforcement of cache locality of at least a portion of the control variables 124 associated with shared ring buffer 122: (i) cache-line protection of control variables, and (ii) batch updates of control variables. These features are discussed in further detail hereinbelow.

Cache-Line Protection:

In general, when a variable has been accessed, it is placed in cache in order to reduce the latency of the subsequent access of the same variable. In order to support efficient thread synchronization on multi-core architectures, false sharing, which occurs when two threads each access different variables residing in the same cache line (the basic building block of a cache), needs to be avoided. When a thread modifies a variable in cache, it invalidates the whole cache line as being modified such that, when another thread accesses a different variable on the same cache line, a cache miss will be triggered and the whole cache line will be reloaded from main memory, even though the variable being accessed remains unchanged.

In one embodiment, this problem is avoided by providing cache line protection of control variables.

In one embodiment, the variable groups are separated with padding bytes whose length is large enough to put each variable group in a different cache line of the cache in which the variable group is stored. This ensures that modification of a variable within one of the variable groups does not cause false sharing to others of the variable groups. This approach is referred to herein as cache line protection.

The use of cache-line protection enables enforcement of cache locality of the control variables of shared ring buffer 122. More specifically, instead of directly checking with shared variables (write and read) for core synchronization, the producer thread $112_1$ and the consumer thread $112_2$ can check with local (non-shared) control variables that reside in their own respective caches, namely, in first cache $114_1$ and second cache $114_2$, respectively.

Figure 2:
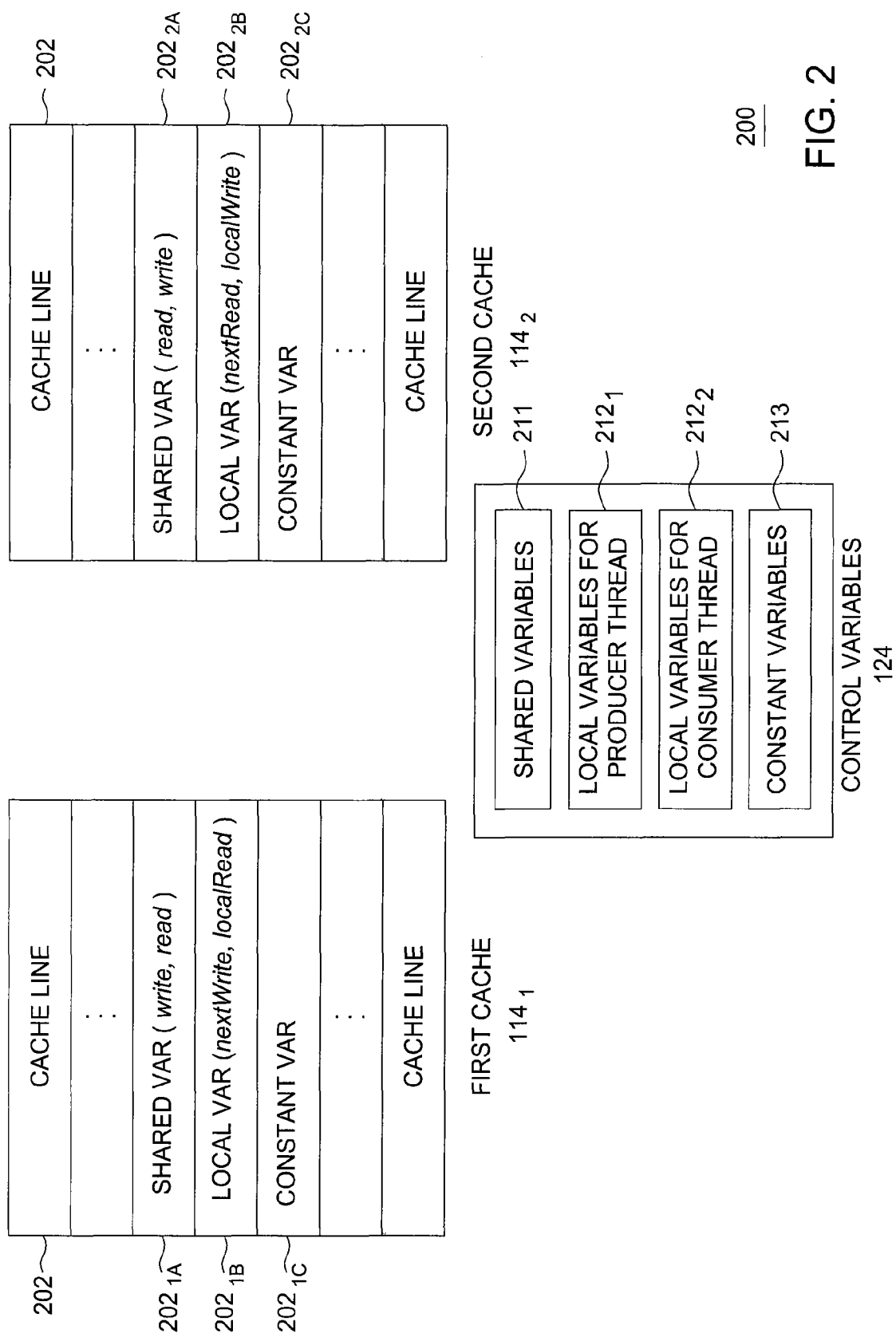
FIG. 2 depicts an embodiment for providing cache-line protection in the multi-core processing system of FIG. 1.

FIG. 2 depicts an embodiment for providing cache-line protection in the multi-core processing system of FIG. 1, thereby enabling enforcement of cache locality of control variables for providing thread synchronization in the multi-core processing system of FIG. 1.

As depicted in FIG. 2, first cache 114 of first core $110_1$ includes a plurality of cache lines $202_1$. The cache lines $202_1$ store control variables adapted for use in controlling access to shared ring buffer 122. In one embodiment, as described herein, control variables belonging to different control variable groups are stored on different cache lines $202_1$ of first cache $114_1$. For example, shared control variables shared by first core $110_1$ and second core $110_2$ (e.g., write and read) are stored on cache line $202_{1A}$, a set of local control variables associated with first core $110_1$ (e.g., nextWrite and localRead) are stored on cache line $202_{1B}$, and constant control variables are stored on cache line $202_{1C}$. In one embodiment, data padding is used to force control variables belonging to different control variable groups to be stored on different cache lines $202_1$.

As depicted in FIG. 2, second cache $114_2$ of second core $110_2$ includes a plurality of cache lines $202_2$. The cache lines $202_2$ store control variables adapted for use in controlling access to shared ring buffer 122. In one embodiment, as described herein, control variables belonging to different control variable groups are stored on different cache lines $202_2$ of second cache $114_2$. For example, shared control variables shared by second core $110_2$ and first core $110_1$ (e.g., read and write) are stored on cache line $202_{2A}$, a set of local control variables associated with second core $110_2$ (e.g., nextRead and localWrite) are stored on cache line $202_{2B}$, and constant control variables are stored on cache line $202_{2C}$. In one embodiment, data padding is used to force control variables belonging to different control variable groups to be stored on different cache lines $202_2$.

Although depicted and described as being stored on particular cache lines and in a particular order, it will be appreciated that the control variables 124 stored in respective caches $114_1$ and $114_2$ may be stored using any suitable cache lines and in any suitable order.

As depicted in FIG. 2, the control variables 124 stored in memory 120 include shared variables 211, local variables 212, for the producer thread $112_1$, local variables $212_2$ for the consumer thread $112_2$, and constant variables 213.

Batch Updates of Control Variables:

In standard shared ring buffers, such as the BasicRingBuffer, the shared variable read (write) is updated after every Extract (Insert) operation. When the producer (consumer) thread modifies write (read), the consumer (producer) thread is forced to reload from memory this shared variable when it checks for the empty (full) condition. The frequent updates of the shared variables cause the memory reload operations to occur frequently as well.

In one embodiment, this problem is avoided by providing batch updates of control variables for reducing the frequency with which the shared control variables, read and write, are modified.

In one embodiment of the batch-update scheme, the shared ring buffer 122 is logically divided into blocks, each of which includes batchSize slots. The producer thread $112_1$ (consumer thread $112_2$) advances the write (read) variable only after a batchSize number of data items have been inserted (extracted) to (from) shared ring buffer 122.

In one such embodiment, local control variables are used by producer thread $112_1$ and consumer thread $112_2$ for implementing the batch-update scheme. For example, local control variables wBatch and rBatch may be placed in the local variable cache lines of first cache $114_1$ and second cache $114_2$ for producer thread $112_1$ and consumer thread $112_2$, respectively. The value of wBatch (rBatch) is incremented by one for every data item being inserted (extracted) by the producer thread $112_1$ (consumer thread $112_2$), and the shared variable write (read) is updated when wBatch (rBatch) equals batchSize. In this embodiment, the wBatch variable may be included within the set of local control variables for producer thread $112_1$, the rBatch variable may be included within the set of local control variables for consumer thread $112_2$, and the batchSize variables may be included within the set of constant variables.

This batch-update scheme enables the shared control variables, read and write, to be modified less frequently than with existing shared ring buffer implementations.

FIG. 3 depicts an embodiment for providing batch updating of control variables in the multi-core processing system of FIG. 1, thereby enabling enforcement of cache locality of control variables for providing thread synchronization in the multi-core processing system of FIG. 1.

As depicted in FIG. 3, shared ring buffer 122 includes n data slots. The n data slots of shared ring buffer 122 are logically partitioned into m blocks of data slots, where each block of data slots includes x data slots.

As depicted in FIG. 3, first cache $114_1$ associated with producer thread $112_1$ stores the wBatch variable in its local control variables cache line and stores the batchSize variable in its constant variables cache line. This enables producer thread $112_1$ to determine locally (i.e., from first cache $114_1$, without accessing memory 120), after each insertion of a data item into shared ring buffer 122, whether or not the shared variable write stored in control variables 124 in memory 120 needs to be updated. As noted hereinabove, in one embodiment, producer thread $112_1$ updates the shared variable write stored in control variables 124 in memory 120 when the wBatch variable equals the batchSize variable.

Similarly, as depicted in FIG. 3, second cache $114_2$ associated with consumer thread $112_2$ stores the rBatch variable in its local control variables cache line and stores the batchSize variable in its constant variables cache line. This enables consumer thread $112_2$ to determine locally (i.e., from second cache $114_2$, without accessing memory 120), after each extraction of a data item from shared ring buffer 122, whether or not the shared variable read stored in control variables 124 in memory 120 needs to be updated. As noted hereinabove, in one embodiment, consumer thread $112_2$ updates the shared variable read stored in control variables 124 in memory 120 when the rBatch variable equals the batchSize variable.

Although depicted and described with respect to a shared ring buffer having specific numbers of data slots logically partitioned into a specific number of blocks where each block has a specific number of data slots, it will be appreciated that a shared ring buffer may include any suitable number of data slots which may be partitioned into any suitable number of blocks having any suitable number of data slots associated therewith. The multi-core thread synchronization capability depicted and described herein is not limited to any particular shared ring buffer size, number of blocks, or block size.

Although the cache-line protection of control variables embodiment and the batch update of control variables embodiment are primarily depicted and described herein as separate embodiments, it will be appreciated that the cache-line protection of control variables embodiment and the batch update of control variables embodiment may be used together to enforce cache locality of control variables for providing thread synchronization in the multi-core processing system. In one such embodiment, for example, first cache $114_1$ and second cache $114_2$ may include all of the control variables depicted and described with respect to the cache-line protection of control variables embodiment and the batch update of control variables embodiment (e.g., the local variables cache line of first cache $114_1$ associated with producer thread $112_1$ may include the nextWrite, localRead, and wBatch local control variables and the local variables cache line of second cache $114_2$ associated with consumer thread $112_2$ may include the nextRead, localWrite, and rBatch local control variables).

In one embodiment, producer thread $112_1$ and consumer thread $112_2$ use busy-waiting rather than sleep-and-wait to poll for the availability of shared ring buffer 122. In one such embodiment, first core $110_1$ and second core $110_2$ are limited such that each core 110 may have, at most, one constantly running thread (either a producer thread or a consumer thread). These features reduce context switching, in which threads release and reclaim process states, which is computationally expensive.

In one embodiment, a memory barrier is placed in each of the busy-waiting loops executed by producer thread $112_1$ and consumer thread $112_2$ (i.e., in the busy-waiting loops of Insert( ) and Extract( ), respectively), in order to force the control variables to be written into memory after being updated. This enables the producer (consumer) to read the correct value of read (write) as soon as it has been updated by the consumer (producer). The use of memory barriers does not affect the correctness of MCRingBuffer and improves the speed of data accesses.

In one embodiment, second core $110_2$ is configured to provide blocking and non-blocking options for the empty condition (i.e., in the Extract( ) function, as depicted in FIG. 4). With blocking, the consumer thread $112_2$ polls for the availability of the shared ring buffer within the function. With non-blocking, the consumer exits the function immediately and the consumer thread $112_2$ needs to call Extract( ) again to in order to access the shared ring buffer. Although non-blocking is generally less efficient than blocking, because it invokes additional function calls, it gives the consumer thread $112_2$ flexibility to perform other tasks without being blocked.

In one embodiment, MCRingBuffer is implemented as a programming template (e.g., using C++or any other suitable programming language), which can take data items of any data type with variable size. In such an embodiment, inserting and extracting data items of large size may be composed of multiple atomic operations, but this does not affect the correctness of MCRingBuffer, provided that reading and writing of the control variables are atomic operations.

FIG. 4 depicts an exemplary embodiment for controlling access by the producer thread and the consumer thread to the shared ring buffer of the multi-core processing system of FIG. 1.

As depicted in FIG. 4, the exemplary embodiment for controlling access by producer thread $112_1$ and consumer thread $112_2$ to shared ring buffer 122 is specified using exemplary pseudo-code, including pseudo-code 410 which defines control variables, pseudo-code 420 which defines the Insert( ) function executed by producer thread $112_1$ to insert into shared ring buffer 122, and pseudo-code 430 which defines the Extract( ) function executed by consumer thread $112_2$ to extract from shared ring buffer 122.

The pseudo-code 410 defines control variables stored as control variables 124 in memory 120 and cached in first cache $114_1$ and second cache $114_2$. The control variables include shared control variables (read and write, defined at lines 2-4 of pseudo-code 410), local control variables for producer thread $112_1$ (e.g., localRead, nextWrite, and wBatch, defined at lines 12-14 of pseudo-code 410), local control variables for consumer thread $112_2$ (e.g., localWrite, nextRead, and rBatch, defined at lines 7-9 of pseudo-code 410), and constant variables (e.g., max, blockOnEmpty, and batchSize, defined at lines 17-19 of pseudo-code 410). The pseudo-code 410 also specifies the cache-line padding required to force the control variable groups onto different cache lines (defined at lines 1, 5, 10, 15, and 20 of pseudo-code 410).

The pseudo-code 420 defines the Insert( ) function executed by producer thread $112_1$ to insert into shared ring buffer 122. The operation of pseudo-code 420 will be understood when viewed in conjunction with the descriptions provided hereinabove of the operation of producer thread $112_1$ to insert into shared ring buffer 122. It will be appreciated that this exemplary embodiment depicted in FIG. 4 includes the memory barrier feature described hereinabove.

The pseudo-code 430 defines the Extract( ) function executed by consumer thread $112_2$ to extract from shared ring buffer 122. The operation of pseudo-code 430 will be understood when viewed in conjunction with the descriptions provided hereinabove of the operation of consumer thread $112_2$ to extract from shared ring buffer 122. It will be appreciated that this exemplary embodiment depicted in FIG. 4 includes the memory barrier and blockOnEmpty features described hereinabove.

Although primarily depicted and described in FIG. 4 with respect to an embodiment using specific control variables, it will be appreciated that the multi-core thread synchronization capability depicted and described herein may be provided using a different set of control variables. Although primarily depicted and described in FIG. 4 with respect to an embodiment using specific pseudo-code for defining the control variables and the Insert( ) and Extract( ) functions, it will be appreciated that the multi-core thread synchronization capability depicted and described herein may be implemented using different definitions of control variables and/or different implementations of the Insert( ) and Extract( ) functions. In other words, the principles of the multi-core thread synchronization capability depicted and described herein are not intended to be limited by the exemplary pseudo-code depicted and described herein, at least because it will be appreciated that the multi-core thread synchronization capability depicted and described herein may be implemented in many different ways.

Figure 5:
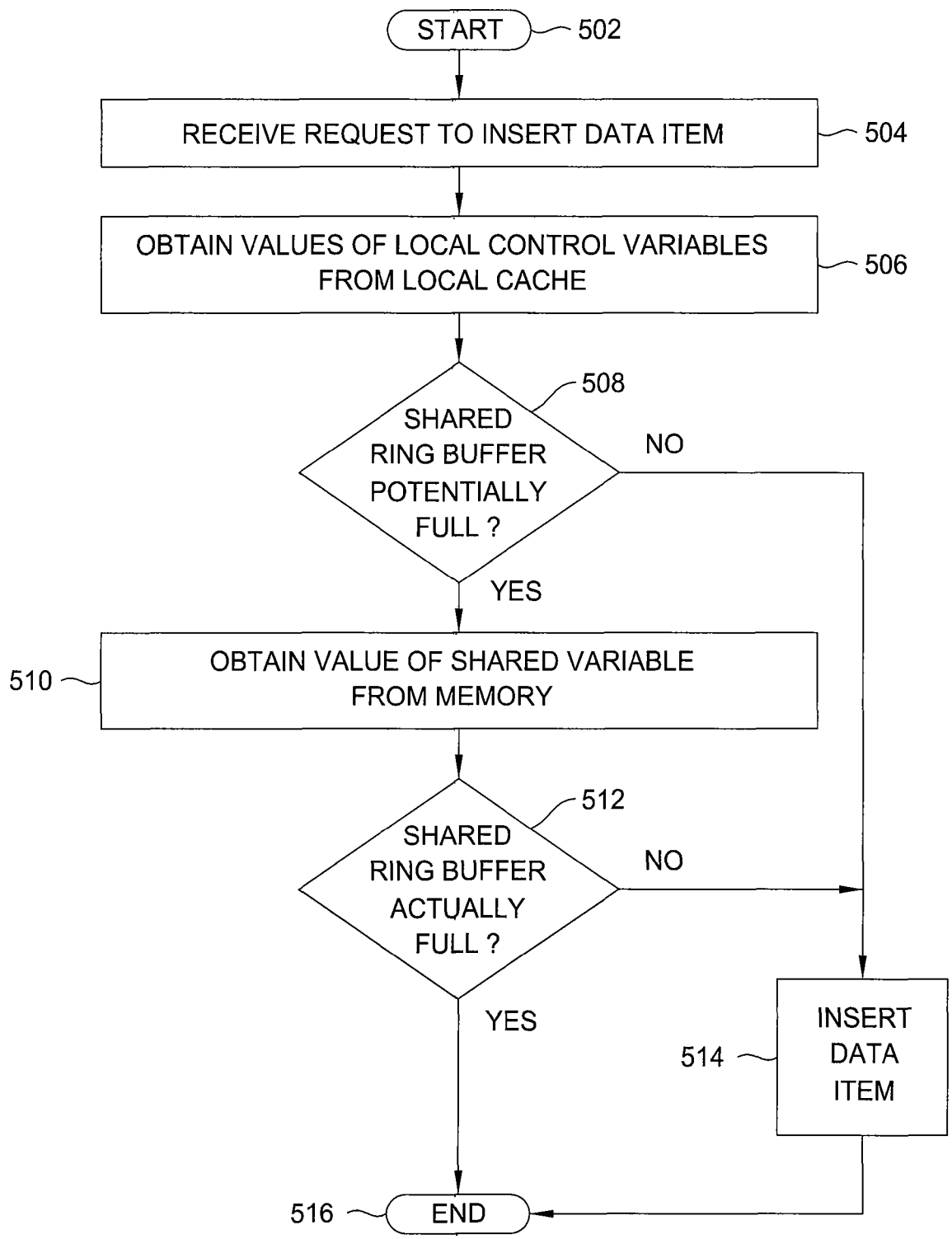
FIG. 5 depicts a high-level block diagram of one embodiment of a method by which a processor may insert data items into a shared ring buffer in the multi-core processing system of FIG. 1.

FIG. 5 depicts a high-level block diagram of one embodiment of a method by which a processor may insert data items into a shared ring buffer in the multi-core processing system of FIG. 1. More specifically, method 500 depicts a method by which a producer thread may insert a data item into the shared ring buffer. Although primarily depicted and described herein as being performed serially, at least a portion of the steps of method 500 may be performed contemporaneously, or in a different order than depicted and described with respect to FIG. 5.

At step 502, method 500 begins.

At step 504, a request to insert a data item is received.

At step 506, values of local control variables are obtained from the local cache of the producer. In one embodiment, for example, values of the nextWrite and the localRead variables (and, optionally, one or more additional variables, such as one or more constant variables) may be obtained from the local cache of the producer thread.

At step 508, a determination is made as to whether the shared ring buffer is potentially full. The determination as to whether the shared ring buffer is potentially full is performed locally by the producer thread using the values of the local control variables (i.e., without requiring access to the memory). In one embodiment, for example, the determination as to whether the shared ring buffer is potentially full is performed by comparing the value of the nextWrite variable with the value of the localRead variable. In this embodiment, if the value of nextWrite equals the value of localRead, the shared ring buffer is determined to be potentially full, otherwise it is determined not to be potentially full. If the shared ring buffer is not potentially full, method 500 proceeds to step 514. If the shared ring buffer is potentially full, method 500 proceeds to step 510.

At step 510, the value of one of the shared variables is obtained from the memory. In one embodiment, for example, the value of the read variable is obtained from the memory.

At step 512, a determination is made as to whether the shared ring buffer is actually full. The determination as to whether the shared ring buffer is actually full is performed by the producer thread using the value of one of the local control variables obtained from the local cache of the producer and the value of the shared variable obtained from the memory. In one embodiment, for example, the determination as to whether the shared ring buffer is actually full is performed by comparing the value of the nextWrite variable with the value of the read variable obtained from the memory. In this embodiment, if the value of nextWrite equals the value of read, the shared ring buffer is determined to be full, otherwise it is determined not to be full. If the shared ring buffer is not actually full, method 500 proceeds to step 514. If the shared ring buffer is actually full, method 500 proceeds to step 516.

At step 514, if the shared ring buffer is not actually full (and, thus, also not even potentially full), the data item is inserted into the shared ring buffer. From step 514, method 500 proceeds to step 516.

At step 516, method 500 ends.

Although depicted and described as ending (for purposes of clarity), it will be appreciated that additional steps may be performed.

In one embodiment, for example, if the shared ring buffer is determined to be full, the producer thread may initiate one or more additional actions. For example, the producer thread may: (1) discard the data item attempting to be inserted into the shared ring buffer; (2) reattempt (e.g., immediately, after some imposed time delay, or after one or more other conditions or criteria are met) inserting the data item into the shared ring buffer (e.g., by continuing to execute method 500 rather than ending (e.g., returning from step 512 to step 506, rather than proceeding from step 512 to step 516), by re-executing all or some of method 500, and the like); and/or (3) perform any other suitable action, which may or may not depend on the application for which method 500 is being used.

In one embodiment, for example, regardless of whether the shared ring buffer is determined to be full, the producer thread may initiate one or more additional actions. For example, the producer thread may update one or more of the control variables in the local cache (e.g., such as by replacing the value of localRead with the current value of read from the memory) and/or perform any other suitable actions.

Although depicted and described as ending (for purposes of clarity), it will be appreciated that method 500 may continue to operate for attempting to insert data items into the shared ring buffer (or, alternatively, method 500 may be re-executed for each data item to be inserted into the shared ring buffer).

Figure 6:
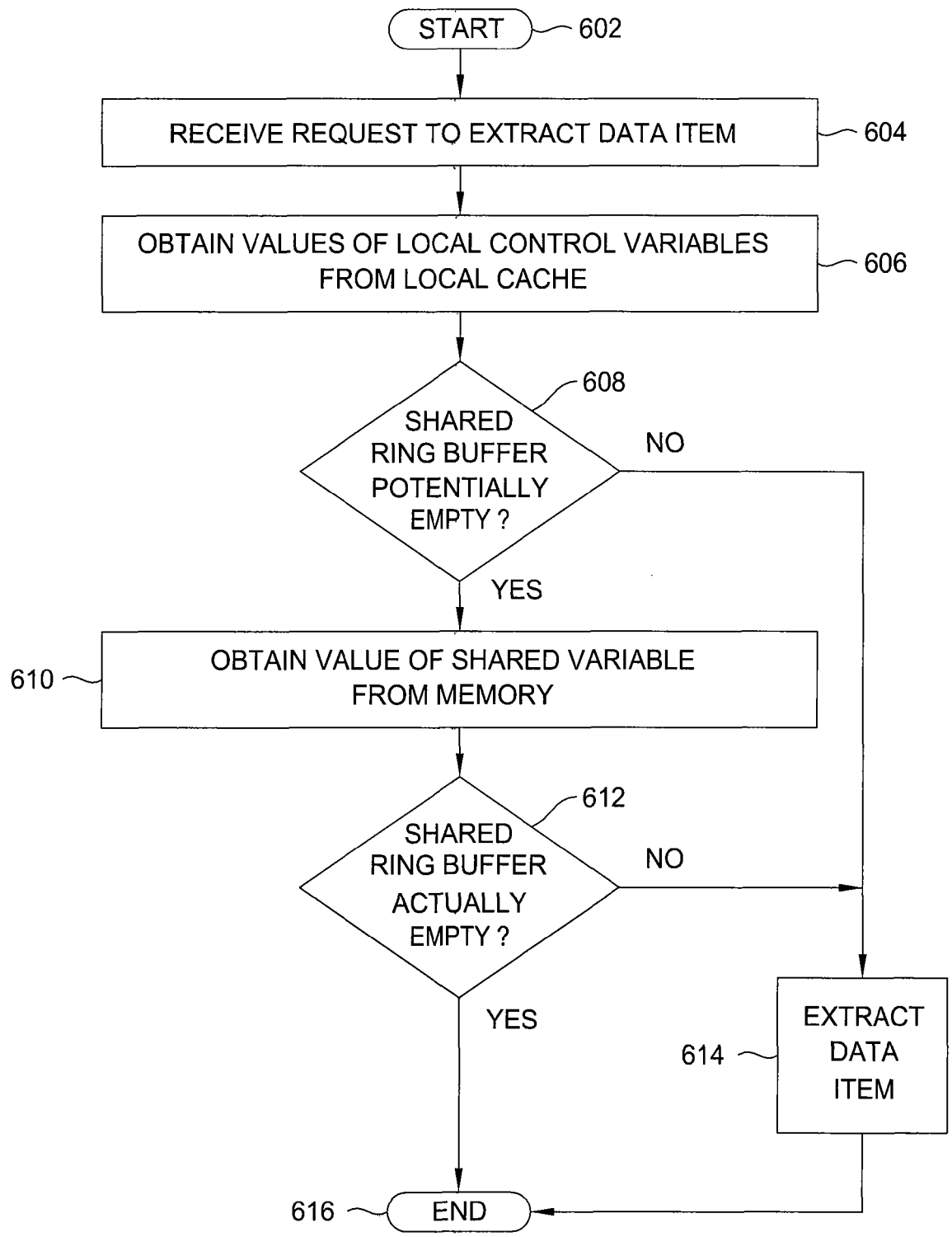
FIG. 6 depicts a high-level block diagram of one embodiment of a method by which a processor may insert data items into a shared ring buffer in the multi-core processing system of FIG. 1.

FIG. 6 depicts a high-level block diagram of one embodiment of a method by which a processor may insert data items into a shared ring buffer in the multi-core processing system of FIG. 1. More specifically, method 600 depicts a method by which a consumer thread may extract a data item from the shared ring buffer. Although primarily depicted and described herein as being performed serially, at least a portion of the steps of method 600 may be performed contemporaneously, or in a different order than depicted and described with respect to FIG. 6.

At step 602, method 600 begins.

At step 604, a request to extract a data item is received.

At step 606, values of local control variables are obtained from the local cache of the consumer. In one embodiment, for example, values of the nextRead and the localWrite variables (and, optionally, one or more additional variables, such as one or more constant variables) may be obtained from the local cache of the consumer thread.

At step 608, a determination is made as to whether the shared ring buffer is potentially empty. The determination as to whether the shared ring buffer is potentially empty is performed locally by the consumer thread using the values of the local control variables (i.e., without requiring access to the memory). In one embodiment, for example, the determination as to whether the shared ring buffer is potentially empty is performed by comparing the value of the nextRead variable with the value of the localWrite variable. In this embodiment, if the value of nextRead equals the value of localWrite, the shared ring buffer is determined to be potentially empty, otherwise it is determined not to be potentially empty. If the shared ring buffer is not potentially empty, method 600 proceeds to step 614. If the shared ring buffer is potentially empty, method 600 proceeds to step 610.

At step 610, the value of one of the shared variables is obtained from the memory. In one embodiment, for example, the value of the write variable is obtained from the memory.

At step 612, a determination is made as to whether the shared ring buffer is actually empty. The determination as to whether the shared ring buffer is actually empty is performed by the consumer thread using the value of one of the local control variables obtained from the local cache of the consumer and the value of the shared variable obtained from the memory. In one embodiment, for example, the determination as to whether the shared ring buffer is actually empty is performed by comparing the value of the nextRead variable with the value of the write variable obtained from the memory. In this embodiment, if the value of nextRead equals the value of write, the shared ring buffer is determined to be empty, otherwise it is determined not to be empty. If the shared ring buffer is not actually empty, method 600 proceeds to step 614. If the shared ring buffer is actually empty, method 600 proceeds to step 616.

At step 614, if the shared ring buffer is not actually empty (and, thus, also not even potentially empty), the data item is extracted from the shared ring buffer. From step 614, method 600 proceeds to step 616.

At step 616, method 600 ends.

Although depicted and described as ending (for purposes of clarity), it will be appreciated that additional steps may be performed.

In one embodiment, for example, if the shared ring buffer is determined to be empty, the consumer thread may initiate one or more additional actions. For example, the consumer thread may: (1) reattempt to extract a data item immediately, (2) reattempt to extract a data item after some imposed time delay, (3) reattempt to extract a data item after one or more conditions or criteria are satisfied, and/or (4) perform any other suitable action, which may or may not depend on the application for which method 500 is being used. In such embodiments, method 600 may continue to be executed (potentially with additional steps associated with measuring time delay, conditions/criteria, and the like), may be terminated and re-executed, and the like.

In one embodiment, for example, regardless of whether the shared ring buffer is determined to be empty, the consumer thread may initiate one or more additional actions. For example, the consumer thread may update one or more of the control variables in the local cache (e.g., such as by replacing the value of localWrite with the current value of write from the memory) and/or perform any other suitable actions.

Although depicted and described as ending (for purposes of clarity), it will be appreciated that method 600 may continue to operate for attempting to extract data items from the shared ring buffer (or, alternatively, method 600 may be re-executed for each data item to be extracted from the shared ring buffer).

Although depicted and described herein as separate processes, it will be appreciated that methods 500 and 600 may be executed concurrently by the producer thread and consumer thread, respectively, thereby providing the producer thread and consumer thread concurrent access to the shared ring buffer.

Additionally, from FIG. 5 and FIG. 6, it will be appreciated that a more general embodiment of a method for enabling a processor in a multi-core processing system (where the processor has a local cache associated therewith) to determine whether to access a shared ring buffer in a memory may be realized as follows: (i) determining, using at least one local variable stored in the local cache, whether a condition associated with the shared ring buffer is potentially satisfied; (ii) if the condition associated with the shared ring buffer is not potentially satisfied, accessing the shared ring buffer for performing a data read or data write operation; (iii) if the condition associated with the shared ring buffer is potentially satisfied, determining, using at least one local variable stored in the local cache and at least one shared variable stored in the memory, whether the condition associated with the shared ring buffer is actually satisfied; and (iv) if the condition associated with the shared ring buffer is not actually satisfied, accessing the shared ring buffer for performing a data read or data write operation.

Although primarily depicted and described herein with respect to embodiments in which the shared ring buffer is implemented using wrapping (e.g., where control variables are set to zero if they are greater than the size of the shared ring buffer), it will be appreciated that the shared ring buffer may be implemented in other ways, such as using implementations in which at least a portion of the control variables associated with the shared ring buffer are monotonically increasing. It will be understood that, in such other implementations, conditions utilized by the producer/consumer threads for determining when to insert/extract data items to/from the shared ring buffer may be different. For example, rather than identifying the shared ring buffer as being potentially full (empty) where NEXT(nextWrite)==localRead (nextRead==localWrite), the producer/consumer thread may identify the shared ring buffer as being potentially full (empty) where nextWrite−localRead<max (nextRead<localWrite). The conditions also may be different for determining whether the shared ring buffer is actually full/empty. It will be appreciated that different variables may be used and, similarly, that different conditions may be defined for determining whether the shared ring buffer is potentially and/or actually full and/or empty.

Although primarily depicted and described herein with respect to use of control variables having specific variable names, it will be appreciated that the control variables may be implemented using any suitable variable names.

Although primarily depicted and described herein with respect to a multi-core processing system having only two cores, it will be appreciated by those skilled in the art and informed by the teachings herein that the multi-core thread synchronization capability may be utilized in multi-core architectures having any number of cores. In one such embodiment, a separate MCRingBuffer, including the shared ring buffer and the associated control variables enabling synchronized access to the shared ring buffer, is implemented between each producer core/consumer core pair in the multi-core processing system.

Although primarily depicted and described herein with respect to a multi-core processing system having a specific system architecture for providing the multi-core thread synchronization capability (e.g., specific numbers and arrangements of cores, caches, memory, and the like), it will be appreciated by those skilled in the art and informed by the teachings herein that the multi-core thread synchronization capability may be utilized in multi-core architectures having various other multi-core processing system architectures. For example, the multi-core thread synchronization capability may be implemented in multi-core architectures using other numbers and/or arrangements of components (e.g., cores, caches, memory, and like components), using other forms of communication between components (e.g., input/output interfaces, system buses, and the like), and/or using other multi-core processing system designs.

Although omitted for purposes of clarity, it will be appreciated that the multi-core processing system also may include various other components, the inclusion of which may or may not depend on the application for which the multi-core processing system is used, such as one or more of: an input interface, an output interface, a receiver, a transmitter, a user input device (e.g., a mouse, a keyboard, a microphone, and the like), a user output device (e.g., a display, a speaker, and the like), one or more additional processing components, one or more additional storage components, and the like, as well as various combinations thereof. Thus, one skilled in the art and informed by the teachings herein will understand that one or more shared ring buffers providing the multi-core thread synchronization capability depicted and described herein may be implemented in various other multi-core processing systems utilizing different multi-core processor system architectures, which may or may not depend on the application for which the multi-core processing system is intended to be used.

A multi-core processing system supporting the multi-core thread synchronization capability depicted and described herein may be used in a variety of application domains, such as general-purpose, embedded, digital signal processing, graphics, network, and the like, as well as various combinations thereof. Thus, a multi-core processing system supporting the multi-core thread synchronization capability depicted and described herein may be used in a variety of applications, such as communication network traffic monitoring, computer gaming, or any other application which may utilize a multi-core processor architecture. The multi-core thread synchronization capability depicted and described herein is not limited to any particular application domain or application.

It should be noted that the present invention may be implemented in software and/or in a combination of software and hardware, e.g., using a general purpose computer, application specific integrated circuits (ASIC), or any other hardware equivalents. Additionally, it is contemplated that some of the steps discussed herein as software methods may be implemented within hardware, for example, as circuitry that cooperates with one or more processors to perform various method steps. Portions of the functions and/or elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a memory, the memory including a shared ring buffer for storing data, the memory configured to store a set of shared variables configured for use in controlling access to the shared ring buffer, wherein the set of shared variables includes a first variable pointing to a next buffer slot of the shared ring buffer into which data is to be inserted and a second variable pointing to a next buffer slot of the shared ring buffer from which data is to be extracted;
a first processor core having a first cache associated therewith, wherein the first cache is configured to store a first set of local variables a third variable pointing to a next buffer slot of the shared ring buffer into which data is to be inserted by the first processor core and a fourth variable providing an estimation by the first processor core as to a current value of the second variable stored in the memory, wherein the first processor core is configured to control insertion of data into the shared ring buffer based on the first set of local variables and the second variable stored in the memory, wherein, to control insertion of data into the shared ring buffer, the first processor core is configured to compare the value of the third variable stored in the first cache with the value of the forth variable stored in the first cache for determining whether the shared ring buffer is potentially full; and
a second processor core having a second cache associated therewith, where in second cache is configured to store a second set of local variables including a fifth variable pointing to a next buffer slot of the shared ring buffer from which data is to be extracted by the second processor core and a sixth variable providing an estimation by the second processor core as to a current value of the first variable stored in the memory, wherein the second processor core is figured to control extraction of data from the shared ring buffer based on the second set of local variables and the first variable stored in the memory, wherein, to control extraction of data from the shared ring buffer, the second processor core is configured to compare the value of the fifth variable stored in the second cache with the value of the as sixth variable stored in the second cache for determining whether the shared ring buffer is potentially empty.

2. The apparatus of claim 1, wherein to control insertion of data into shared ring buffer, the first processor core is further configured to:
based on determination that the shared ring buffer is not potentially full, insert the data item into the shared ring buffer;
based on determination that the shared ring buffer is potentially full, determine, based on at least one local variable from the set of local variables stored on the first cache and one of the shared variables from the set of shared variables stored in the memory, whether the shared ring buffer is actually full; and
based on determination that the shared ring buffer is not actually full, insert the data item into the shared ring buffer.

3. The apparatus of claim 1, wherein, to control extraction of data from the shared ring buffer, the second processor core is further configured to:
based on a determination that the shared ring buffer is not potentially empty, extract the data item from the shared ring buffer;
based on determination that the shared ring buffer is potentially empty, determine, based on at least one local variable from the second set of local variables stored in the second cache and one of the shared variables from the set of shared variables stored in the memory, whether the shared ring buffer is actually empty; and
based on a determination that the shared ring buffer is not actually empty, extract the data item from the shared ring buffer.

4. The apparatus of claim 1, wherein to control insertion of data the shared ring buffer, the first processor core is further configured to:
based on determination that the shared ring buffer is potentially full, insert the data item into the shared ring buffer;
based on determination that the shared ring buffer is potentially full, compare the value of the third variable with the value of the second variable stored in the memory for determining whether the shared ring buffer is actually full; and
based on the determination that the shared ring buffer is not actually full, insert the data item into the shared ring buffer.

5. The apparatus of claim 1, wherein, to control extraction of data from the shared ring buffer, the second processor core is further configured to:

based on determination that the shared ring buffer is not potentially empty, extract the data item from the shared ring buffer;

based on determination that the shared ring buffer is potentially empty, compare the value of the fifth variable with the value of the first variable stored in the memory for determining whether the shared ring buffer is actually empty; and based on determination that the shared ring buffer is not actually empty, extract the data item from the shared ring buffer.

6. The apparatus of claim 1, wherein at least one of:

the first set of local variables is arranged within the first cache in a manner for providing cache-line protection for the first cache; or the second set of local variables is arranged within the second cache in a manner for providing cache-line protection for the second cache.

7. The apparatus of claim 6, wherein cache-line protection is provided using data padding.

8. The apparatus of claim 1, wherein the at least one shared variable of the set shared variables is cached within the first cache, wherein the at least one shared variable and the first set of local variables are stored on different cache lines of the first cache.

9. The apparatus of claim 1, wherein the at least one shared variables of the set of shared variables is cached within the second cache, wherein the at least one shared variable and the second set of local variables are stored on different cache lines of the second cache.

10. The apparatus of claim 1, wherein the first processor core and the second processor core are configured to update the set of shared variables in the memory using batch updates.

11. The apparatus of claim 1, wherein:

the first processor core is configured to update the first variable using the third variable stored in the first cache; and the second processor core is configured to update the second variable using the fifth variable stored in the second cache.

12. The apparatus of claim 1, wherein the shared ring buffer comprises a plurality of data slots for storing data items, wherein the shared ring buffer is divided into a plurality of blocks, wherein each block has associated therewith a block size that is indicative of a number of data slots of the shared ring buffer that are included within the block.

13. The apparatus of claim 12, wherein:

the first processor core is configured to:

increment a seventh variable based on insertion of data item into the shared ring buffer by the first processor core;

compare the seventh variable to the block size after updating of the seventh variable; and based on determination that the seventh variable equals the block size, trigger an update of the first variable in the memory; and the second processor core is configured to:

increment an eight variable based on extraction of a data item from the shared ring buffer by the second processor core;

compare the eight variable to the block size after updating of the eight variable; and based on a determination the eight variable equals the block size, trigger an update of the second variable memory.

14. The apparatus of claim 1, wherein the first processor core and the second processor core each are configured to use busy-waiting to poll for availability of the shared wing buffer.

15. The apparatus of claim 1, wherein the first processor core is configured to support a first thread that is the only constantly running thread on the first processor core and the second processor core is configured to support a second thread that is the only constantly running thread on the second processor core.

16. The apparatus of claim 1, wherein at least one of:

the first processor core is configured to use at least one memory barrier to force at least one shared variable of the set of shared variables to be written into the memory after being update; and the second processor core is configured to use at least one memory barrier to force at least one shared variable of the set of shared variables to be written into the memory after being updated.

17. A multi-core processor, comprising:

a memory, the memory including a shared ring buffer for storing data, the memory configured to store a set of shared variables configured for use in controlling access to shared ring buffer, wherein the set of shared variables includes a first variable pointing to a next buffer slot of the shared ring buffer into which data is to be inserted and a second variable pointing to a next buffer slot of the shared ring buffer from which data is to be extracted;

a first processor core having a first cache associated therewith, wherein the first cache is configured to store a first set of local variables including a third variable pointing to a next buffer slot of the shared ring buffer into which data is to be inserted by the first processor core and a fourth variable providing an estimation by the first processor core as to a current value of the second variable stored in the memory, wherein the first processor core is configured to control insertion of data into the shared ring buffer based on the first set of local variables and the second variable stored in the memory, wherein, to control insertion of data into the shared ring buffer, the first processor core is configured to compare the value of the third variable stored in the first cache with the value of thee fourth variable stored in the first cache for determining whether the shared ring buffer is potentially full; and a second processor core having a second cache associated therewith, wherein the second cache is configured to store a second set of local variables including a fifth variable pointing to a next buffer slot of the shared ring buffer from which data is to be extracted by the second processor core and a sixth variable providing an estimation by the second processor core as to a current value of the first variable stored in the memory, wherein the second processor core is configured to control extraction of data from the shared ring buffer based on the second set of local variables and the first variable stored in the memory, wherein, to control extraction of data from the shared ring buffer, the second processor core is configured to compare the value of the fifth variable stored in the second cache with the value of the sixth variable stored in the second cache for determining whether the shared ring buffer is potentially empty.

18. A method, comprising:

storing set of shared variables in a memory, the memory including a shared ring buffer for storing data, the set of shared variables configured for use in controlling access to the shared ring buffer, wherein the set of shared variables includes a first variable pointing to a next buffer slot of the shared ring buffer into which data is to be inserted and a second variable pointing to a next buffer slot of the shared ring buffer from which data is to be extracted;

inserting data items into the shared ring buffer using a first processor core having a first cache associated therewith, wherein the first cache stores a first set of local variables including a third variable pointing to a next buffer slot of the shared ring buffer into which data is to be inserted by the first processor core and a fourth variable providing an estimation by the first processor core as to a current value of the second variable stored in the memory, wherein the first processor core is configured to control insertion of data into the shared ring buffer based on the first set of local variables and the second variable stored in the memory, wherein, to control insertion of data into the shared ring buffer, the first processor core is configured to compare the value of the third variable stored in the first cache with the value of the fourth variable stored in the first cache for determining whether the shared ring buffer is potentially full; and extracting data items from the shared ring buffer using a second processor core having a second cache associated therewith, wherein the second cache stores a second set of local variables including a fifth variable pointing to a next buffer slot of the shared ring buffer from which data is to be extracted by the second processor core and a sixth variable providing an estimation by the second processor core as to a current value of the first variable stored in the memory, wherein the second processor core is configured to control extraction of data from the shared ring buffer based on the second set of local variables and the first variable stored in the memory, wherein, to control extraction of data from the shared ring buffer, the second processor core is configured to compare the value of the fifth variable stored in the second cache with the value of the sixth variable stored in the second cache for determining whether the shared ring buffer is potentially empty.

* * * * *